United States Patent [19]

Goel

[11] Patent Number: 4,775,735

[45] Date of Patent: Oct. 4, 1988

[54] AMINE THIOCYANATES AS ACCELERATORS FOR CURE OF POLYEPOXIDE-POLYIMINE MATERIALS

[75] Inventor: Anil B. Goel, Worthington, Ohio

[73] Assignee: Ashland Oil, Inc., Ashland, Ky.

[21] Appl. No.: 105,757

[22] Filed: Oct. 7, 1987

[51] Int. Cl.$^4$ .................... C08G 59/68; C08G 59/50
[52] U.S. Cl. ................................. 528/90; 528/109; 528/361; 528/407
[58] Field of Search ................. 528/90, 109, 361, 407

[56] References Cited

U.S. PATENT DOCUMENTS

| | | | |
|---|---|---|---|
| 3,291,775 | 12/1966 | Holm | 528/121 |
| 3,361,715 | 1/1968 | Vogt et al. | 528/90 |
| 3,378,600 | 4/1968 | Hodges et al. | 528/123 X |
| 3,660,354 | 5/1972 | Uelzmann | 528/90 X |
| 4,161,575 | 7/1979 | Seymour et al. | 528/90 |

*Primary Examiner*—Earl Nielsen
*Attorney, Agent, or Firm*—John F. Jones

[57] ABSTRACT

A moisture curable composition comprising a mixture of
(A) a polyepxoide
(B) a polyimine curing agent and
(C) an amine thiocyanate salt cure accelerator,
and a process for curing said composition in an atmosphere having a relative humidity of from about 20% to about 90% at a temperature in the range of from about 15° C. to about 150° C. are described.

20 Claims, No Drawings

AMINE THIOCYANATES AS ACCELERATORS FOR CURE OF POLYEPOXIDE-POLYIMINE MATERIALS

This invention relates to rapidly curing polyepoxide-polyimine compositions and more particularly pertains to the use of amine-thiocyanate cure accelerators in polyepoxide-polyimine compositions to produce latent curing materials which have long shelf life under anhydrous conditions but which cure rapidly under moist conditions.

Many aromatic and aliphatic polyamines (primary, secondary, mixed primary and secondary, and combinations of these with tertiary amines) and amido amines therefrom are known as curing agents for epoxy resins to form thermoset polymers useful in many industrial applications. These conventional curing agents have some drawbacks that greatly limit their use in industrial applications. Curing agents which provide reasonably fast curing of epoxy resins at moderately elevated temperatures often exhibit poor pot life (setting up of the material before it can be used), thus limiting the working time of the material. On the other hand, epoxy resin materials which contain polyimines as curing agents have long pot life but cure very slowly, particularly in moist atmospheres, thus requiring long curing times. The cure accelerators of this invention when mixed with polyepoxides and imine curing agents give compositions which have long pot life when moisture is excluded from them and they cure rapidly when exposed to the moisture in the atmosphere.

Polyepoxide-curing agent materials are well known and have been used in applications such as adhesives, coatings and the like in the past. Attempts have been made to produce such materials which have reasonably long pot life and which will cure reasonably rapidly at moderate temperatures. In order to obtain longer pot life at ambient temperatures, either polyphenate salts of amines as shown in U.S. Pat. No. 3,519,576 or polyimines as described in U.S. Pat. No. 3,291,775 have been used to provide latent curing epoxy resin compositions. The addition of conventional cure accelerators such as phenols as described in U.S. Pat. No. 3,291,775 in the polyepoxide/polyimine system improves the cure speed to some extent but the rate of cure is still relatively slow requiring several minutes to several hours for complete cure at moderately elevated temperatures. The addition of tertiary amine catalysts, which are also known to be epoxy resin homopolymerization catalysts, to epoxy resin systems usually results in shortening the pot life of the system.

It is an object of this invention to provide a modified latent curing epoxy resin composition which has long pot life under atmospheres substantially free of moisture and which will cure rapidly at room temperature and low-to-moderately elevated temperatures (from about room temperature up to about 150 degrees C. or higher) under moist atmospheric conditions. It is also an objective of this invention to provide latent curing epoxy resin compositions which are particularly useful for the preparation of surface coatings.

I have discovered latent curing (cure rapidly under moist conditions) epoxy resin compositions which comprise mixtures of (A) a polyepoxide, (B) a polyimine curing agent, and (C) from about 0.5 to about 15% and preferably from about 0.5% to about 10% by weight of combined (A) and (B) of an amine thiocyanate cure accelerator.

I have found that the epoxy resin compositions embodied in this invention are essentially inert towards catalysis of the polymerization of either polyepoxides by themselves or polyepoxide-polyimine curing agent mixtures under substantially moisture free conditions. Surprisingly, when the latent curing compositions embodied in this invention are exposed to moisture (i.e., atmospheric moisture) they will cure rapidly at ambient temperatures or above. Thus, the compositions of this invention which are comprised of a polyepoxide, a polyimine curing agent, and an amine thiocyanate cure accelerator, in the absence of moisture exhibit long open time (pot life) and when exposed to atmospheric moisture (i.e., are spread out as a coating on a substrate in contact with the moisture present in the air) cure rapidly to give hard, thermoset polymers.

Polyepoxides (or epoxy resins) useful in the practice of this invention can be monomeric or polymeric, saturated or unsaturated, aliphatic, cycloalihatic, aromatic or heterocyclic, and they may be substituted if desired with other substituents besides the epoxy groups, e.g., hydroxyl groups, ether radicals, halogen atoms, and the like.

Typical polyepoxides suitable in the practice of this invention include those disclosed in U.S. Pat. Nos. 2,500,600 and 2,324,483 which are incorporated herein by reference. Preferred in this invention are 1,2-epoxy compounds having an epoxide equivalence greater than 1, that is to say, compounds containing more than one group of the formula:

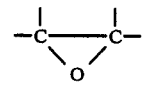

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidylester groups. Compounds with inner epoxide groups usually contain the 1,2-epoxide group in an aliphatic chain or in a cycloaliphatic ring.

As polyepoxides containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized diolefinically unsaturated carboxylic acid esters, such as methyl-9,10,12,13-diepoxy stearate or the dimethyl ester of 6,7,10,11-diepoxyhexadecane-1,16-dicarboxylic acid. Furthermore, there may be mentioned epoxidized mono-, di-, or polyesters and mono-, di-, or polyacetals containing at least one cycloaliphatic 5-membered or 6-membered ring, to which at least two 1,2-epoxidized groups are linked.

A widely used class of polyepoxides which are useful in the practice of this invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

Polyimine curing agents (B) of this invention are those obtained by reacting ketones or aldehydes with mono-, di-, or polyamines and preferably aliphatic polyamines having any combination of primary, secondary, mixed primary and secondary amine and combinations of these with tertiary amines. The presence of tertiary amines is less desirable since they often promote the condensation of ketones and aldehydes and result in shortening the pot life of the mixed polyepoxide/polyimine mixtures. Preferred polyimines for use in this invention are those having the formula I:

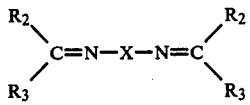

wherein

is the residue obtained from a monoketone or monoaldehyde by removing the ketone or aldehyde oxygen atom, and =N—X—N= is the residue from a polyamine obtained by removing the two hydrogens from terminal primary amine group.

The ketones noted above may be aliphatic, cycloaliphatic, heterocyclic or aromatic and saturated or unsaturated. They may also be substituted with other groups, such as ester, carboxylic acid, alkoxy and halogen atoms. The preferred ketones contain from 3 to 25 carbon atoms. Examples of the ketones include, among others, methyl ethyl ketone, dimethyl ketone, diethyl ketone, methyl isobutyl ketone, dibutyl ketone, diisobutyl ketone, methyl isopropyl ketone, methyl octyl ketone, ethyl butyl ketone, methyl phenyl ketone, cyclohexanone, dioctyl ketone, cyclohexyl methyl ketone, chloral methyl ketone, methoxymethyl butyl ketone, cyclohexeneyl allylketone, levulinic acid, methyl levulinate, butyl levulinate, beta-hydroxybutyl methyl ketone, didodecyl ketone, dioctadecyl ketone, methyl decyl ketone, and the like.

Aldehydes noted above as useful in preparation of the imines embodied in this invention may be aliphatic, cycloaliphatic, heterocyclic or aromatic and either saturated or unsaturated. They may also be substituted with other groups such as ester, carboxylic acid, hydroxyl, ether and halogen. Preferred aldehydes contain from 2 to 25 carbon atoms. Representative of these aldehydes include acetaldehyde, propionaldehyde, chloropropionaldehyde, butyraldehyde, isobutyraldehyde, valeroaldehyde, caproic aldehyde, heptoic aldehyde, methacrolein, nicotinaldehyde, cinchonialdehyde, 2-pyrancarboxaldehyde, tetrahydropyran-2-carboxaldehyde, 2-furaldehyde, crotonaldehyde, acrolein, benzaldehyde, 1-naphthaldehyde, durene dialdehyde, glutaraldehyde, 1-cyclohexene-1-carboxaldehyde, 1-cyclopentene-1-carboxaldehyde. Preferred aldehydes to be used include the aliphatic, cycloaliphatic and aromatic mono- and dialdehydes containing from 2 to 20 carbon atoms and still more preferably from 2 to 20 carbon atoms and most preferred from 2 to 12 carbon atoms.

The amines used in the preparation of the polyimines embodied in this invention are those which possess at least two primary amine groups per molecule, and preferably those which have no more than six amino nitrogen groups per molecule. The polyamines may be aliphatic, cycloaliphatic, heterocyclic or aromatic and may be either saturated or unsaturated. They may also be substituted with various substituents, such as ester groups, urethane groups, hydroxyl groups, thio groups, ether groups and the like. Representative polyamines of this type include ethylene diamine, diethylene triamine, pentamethylene diamine, hexamethylene diamine, butylene diamine, xylylene diamine, phenylene diamine, diaminodiphenylsulfone, methylenedianiline, triaminobenzene, 2,3-diaminotoluene, 2,3'-diaminodiphenyl, 1,3-diamino-4-isopropylbenzene, 1,3-diamino-4,5-diethylbenzene, diaminostilbene, triethylene tetramine, tetraethylene pentamine, diaminopyridine, N,N-diethyl-1,3-propanediamine, 1,10-decanediamine, 1,4-diaminocyclohexane, 1,3-diaminocyclopentane, 1,4-diamino-2-cyclohexene, 1,18-octadecanediamine, propylene diamine, dipropylene triamine, alkanolamines, bis(amino methyl) cyclohexane, dimer acid diamine, poly(oxy alkylene) polyamines, and the like and mixtures thereof.

Other polyamines that may be used in the formation of the polyimines embodied in this invention include those which are obtained by coupling two or more of the above-noted polyamines together by reaction with acids to form polyamines, reaction with isocyanates to form polyurethanes, and reaction with isocyanates to form polyurethanes, and reaction with polyepoxides to form hydroxypolyamines. Also included are those polyamines formed by reacting a hydroxymonoamine with an acid or anhydride, or by reacting an unsaturated amine, such as allylamine with hydrogen sulfide, polymercaptans, phosphorus trichloride and the like.

Representative polycarboxylic acids or anhydrides that may be reacted with the above-noted polyamines or hydroxyamines to form new polyamines for use in the preparation of the polyimines include the aliphatic, cycloaliphatic, aromatic and heterocyclic polycarboxylic acids or anhydrides such as dimerized and trimerized unsaturated fatty acids such as linoleic acids and the like, phthalic anhydride, terephthalic anhydride, adipic acid, sebacic acid, trimellitic anhydride, pyromellitic anhydride, chlorophthalic anhydride, tetrahydrophthalic anhydride, methoxytetrahydrophthalic anhydride, and the like.

Representative isocyanates that may be reacted with the above-described polyamines to form polyamines include hexamethylene diisocyanate, methylene bis(phenyl isocyanate), toluene diisocyanate, pentamethylene diisocyanate, durene diisocyanate, cyclohexane diisocyanate, cyclopentene diisocyanate, dodecane diisocyanate, and the like. Especially preferred are the aliphatic, cycloaliphatic and aromatic diisocyanates.

Representative of the polyepoxides that may be used in reaction with the polyamines to form polyimines useful in this invention include those described above as materials to be cured by the polyimines. Especially useful are the aliphatic, cycloaliphatic and aromatic diepoxides containing up to 30 carbon atoms per molecule.

Representative of the unsaturated monoamines useful in the reaction with hydrogen sulfide, mercaptans and phosphorous trichloride to obtain new polyamines include allyl amine, butenyl amine, cyclohexenylamine and the like. Preferred is allylamine. The mercaptans to be used include 1,3-propanedithiol, 1,4-butanedithiol, 1,5-pentanedithiol, 1,4-cyclohexanedithiol, 1,4-benzenedithiol and the like. Preferred are the alkanedithiols, cycloalkanedithiols and aromatic dithiols having up to 18 carbon atoms.

Other polyimines which can be used in the practice of this invention are those preferably prepared by reacting polyketones or polyaldehydes with monoamines, such as those of the formula II:

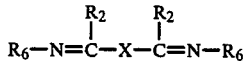

wherein $R_6$ is the residue obtained from the monoamine by removing the amino group, and

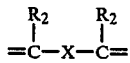

is the residue from the polyaldehyde or polyketone by removing the ketone or aldehyde oxygen atoms.

The polyketones and polyaldehydes noted above may be aliphatic, cycloaliphatic, heterocyclic or aromatic and may be saturated or unsaturated. They may also be substituted with other groups, such as ester, carboxylic acid, hydroxyl, alkoxy and halogen atoms or groups. Examples of these include 1,4-butanedicarboxyaldehyde, 1,5-pentanedicarboxaldehyde, decanedicarboxaldehyde, 1,18-octadecanedicarboxaldehyde, 1,4-cyclohexanedicarboxaldehyde, 1-cyclohexene-2,5-dicarboxaldehyde, 2,7-naphthalenedicarboxaldehyde, 1,4-benzenedicarboxaldehyde, 1,6-hexanedicarboxaldehyde, hydroxyadipaldehyde and the like, and 1,4-octanedione, 2,4-pentanedione, 2,6-dodecanedione, 2,5-hexanedione, 1,4-cyclohexanedione, 1,3-cyclopentanedione, 1,4-cyclohexenedione, 3,6-octadecanedione, 3,8-dodecanedione and the like. Preferred aldehydes and ketones are the dialdehydes and diketones containing up to 18 carbon atoms per molecule.

The monoamines used in making the above-noted polyimines may also be aliphatic, cycloaliphatic, heterocyclic or aromatic and may be saturated or unsaturated. They may also be substituted with other groups, such as ester, carboxylic acid, hydroxyl, alkoxy and halogen atoms or groups. Representative of these include methylamine, butylamine, propylamine, hexylamine, dodecylamine, tetradecylamine, allylamine, butenylamine, octadecylamine, octadecenylamine, cyclohexylamine, cyclohexeneylamine, cyclopentenylamine, isopropylcyclohexylamine, tert-butylbenzylamine, phenylamine and the like.

Particularly useful and preferred polyimines for the practice of this invention include compounds of the formula III

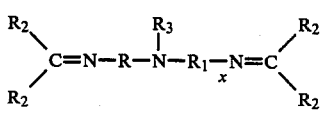

wherein x is an integer including 0 and preferably 0 to 4, R and $R_1$ are bivalent hydrocarbon radicals, $R_2$ is a member of the group consisting of hydrogen, open-chain hydrocarbon radicals and cyclic hydrocarbon radicals including those cyclic radicals formed by joining together two of the $R_2$ radicals which are attached to the same carbon atoms, carboxyl substituted hydrocarbon radicals, carbalkoxy substituted hydrocarbon radicals, hydroxyl substituted hydrocarbon radicals, alkoxy substituted hydrocarbon radicals, and halogen substituted hydrocarbon radicals, and $R_3$ is a member of the group consisting of hydrogen, hydrocarbon radicals and

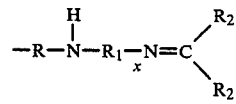

radicals and compounds of the formula IV:

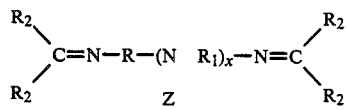
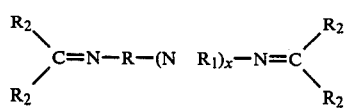

wherein x is an integer of at least 1 and preferably 1 to 4, Z is a bivalent hydrocarbon radical, and R, $R_1$ and $R_2$ are as described above.

Compounds of the formula V:

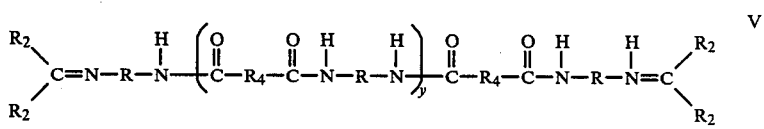

wherein y is an integer including 0 and preferably 0 to 4, $R_4$ is the residue of a polycarboxylic acid by removing the two carboxyl groups and preferably a hydrocarbon radical, R and $R_2$ being as described above.

Compounds of the formula VI:

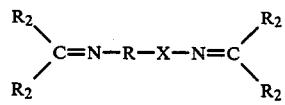

wherein X is a member of the group consisting of oxygen, sulfur and phosphorus and R and $R_2$ are as described above, Compounds of the formula VII:

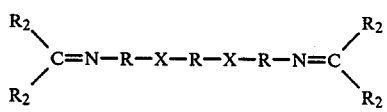

wherein X is a member of the group consisting of oxygen, sulfur and phosphorous and R and $R_2$ are as described above.

Compounds of the formula VIII:

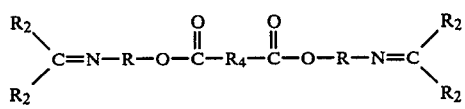

wherein R, R₂ and R₄ are as described above.

In the above described formulae, R, $R_1$, $R_3$, $R_4$ and $R_5$ may be hydrocarbon radicals, and preferably aliphatic, cycloaliphatic or aromatic radicals. The radicals represented by $R_2$ may be exemplified by monovalent radicals, such as methyl, ethyl, propyl butyl, isobutyl, amyl, decyl, dodecyl, octadecyl, tetradecyl, eicosanyl, allyl, vinyl butenyl, cyclohexyl, cyclopentyl, cyclobutyl, cyclohexenyl, cyclopentyl, octadecadienyl, phenyl, benzyl, naphthyl, tert-butylphenyl, and the like. Preferred radicals are those containing from 1 to 18 carbon atoms, and still more preferably, 1 to 10 carbon atoms. The radicals represented by R, $R_1$, $R_3$, $R_4$ and $R_5$ may be exemplified by bivalent radicals such as methylene, ethylene, propylene, butylene, dodecylene, tetradecylene, allylene, cyclohexylene, cyclobutylene, phenylene, tert-butylphenylene and the like. Preferred radicals of this type contian from 1 to 18 carbon atoms, and still more preferably, from 1 to 10 carbon atoms.

Representative of the polyimines useful in this invention include N,N'-di(2-propylidene) 1,5-pentanediamine, N,N'-di(1-propylidene) 1,6-hexanediamine, N,N'-di(2-propylidene) 3-aza-1,5-pentanediamine, N,N'-di(2-butylidene) 1,4-cyclohexanediamine, N,N'-di(2-butylidene) 3,6-aza-1,8-octanediamine, N,N'-di(1-butylidene) 1,8-octanediamine, -N,N'-di(2-propylidene) 1,4-benzenediamine, N,N'-di(2-propylidene) 2,2-bis(aminophenyl) propane, N,N'-di(2-butylidene) 2,2-bis(4-aminophenyl) sulfone, N,N'-di(2-butylidene) 2,2-bis(4-aminophenyl) methane, N,N'-di(4-methoxy-2-hexylidene) 2,2-bis(4-aminophenyl) propane, N,N'-di(4-chloro-2-hexylidene)[2,2-bis(4-aminophenyl)]propane, N,N'-di(4-chloro-2-hexylidene) 1,5-pentanediamine, N,N'-di(2-methoxy-4-hexylidene) 1,5-pentanediamine, N,N'-di(3-allyl-6-octylidene) 1,5-pentanediamine, N,N'-diocyl 1,5-pentanediamine, N,N'-di-phenyl 1,6-octanediimine, N,N'-dioctyl 1,4cyclohexanediimine, N,N'-diproply 3-aza-1,5-pentanediimine, N,N'-dicyclohexyl, 3,6-diaza-1,8-octanediimine, N,N'-dioctyl 3-aza-1,5-pentanediimine, N,N'-diallyl 1,4-benzenediimine, N,N'-dioctyl 2,2-bis(4-aminophenyl) propane,

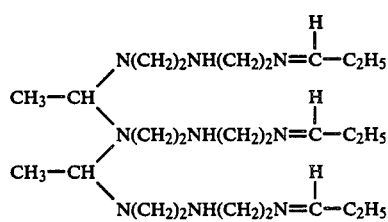

N,N'-disalicylidene phenylenediamine, N,N'-disalicylidene-1,2-propylenediamine, N,N'-dibenzylidene ethylene diamine,

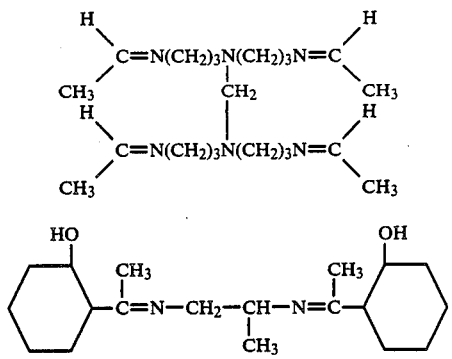

N,N'-di(2-carbethoxy-4-hexylidene) 1,5-pentanediamine, N,N'-di(2-butoxy-4-hexylidene) 1,6-hexanediamine, N,N'-di(1-chloro-2-butylidene) 1,5-pentanediamine, N,N'-di(1-hydroxy-4-octylidene) 1,6-hexanediamine, N,N'-di(2-carbethoxy-4-dodecylidene) 1,8-octanediamine, N,N'-di(butoxy-4-hexylidene)4-thiahexane-1,6-diamine, N,N'-di(4-hexylidene) 2,4-dithiaoctane-1,8-diamine, N,N'-di(5-octylidene) 4-oxahexane-1,6-diamine, N,N'-di(5-dodecylidene) 2, 4-diazaoctane-1,8-diamine, N,N'-di(2-propylidene) 2,1-dioxaoctane-1,8-diamine, N,N'-di(3-butylidene) 2,4,8,10-tetraazoooctadecane-1,18-diamine, ketimine of poly(oxypropylene) triamine and methyl isobutyl ketone, ketimine of an amino-terminated polyamine of dimerized linoleic acid and ethylene diamine, and methyl isobutyryl ketone, ketimine of an amino-terminated polyamide of phthalic acid and 1,6-hexanediamine and methyl isobutyl ketone, ketimine of an amino-terminated polyamide of dimerized linoleic acid and diethylene triamine, and methyl ethyl ketone, ketimine of an amino-terminated polyamine of tetrahydrophthalic acid and 1,4-butanediamine and diisobutyl ketone, ketimine of an amino-terminated polyurethane of toluene diisocyanate 1,6-hexanediamine and methyl isobutyl ketone, ketimine of an amino-terminated polyurethane of toluene diisocyanate and 1,8-octanediamine and diamyl ketone, ketimine of an amino-terminated polyester of amino ethanol and dimerized linoleic acid and methyl octyl ketone, ketimine of an amino-terminated polyester of amino ethanol and isophthalic acid and methyl isobutyl ketone, ketimine of an amino-terminated polyurethane of durene diisocyanate and diethylene triamine and isobutyl octyl ketone, 2,6-diaza-3,5-dibutyl-2,5-heptadiene, 2,7-diaza-3,6-diallyl-2,6-octadiene, 2,6-diaza-2,5-diethyl-2,5-heptadiene, 4,8-diaza-5,7-diethyl-4,7-hexidecadiene, 2,6-diaza-3,5-dioctyl-2,5-dodecadiene, 3,8-diaza-4,7-diphenyl-3,7-decadiene, 3,8-diaza-4,7-dibenzyl-3,7-tetradecadiene, 2,6-diaza-3,5-dicyclohexyl-2,5-heptadiene, 3,9-diaza-6-thia-4,8-dibutyl-3,8-tetradecadiene, octylidene)-di(aminophenyl) methane.

The polyimines may be prepared by methods disclosed in U.S. Pat. Nos. 2,533,723; 2,692,284; 2,765,340; and 2,692,283.

The polyimines may be either purified or a crude mixture containing varying amounts of ketone polymerization product attached through an imine linkage at the nitrogen, thus giving mixed imine that may be advantageously used since they give both curing and flexibilizing effects to the epoxy composition.

Amine thiocyanate salts, as cure accelerators of this invention, are obtained either by the reaction of an amine with thiocyanic acid or by the reaction of an amine with ammonium thiocyanate. When ammonium thiocyanate is mixed with primary, secondary, tertiary or mixed primary and secondary or mixed primary or secondary with tertiary amine containing mono-, di- and polyamines, ammonia evolution occurs. This ammonia displacement reaction proceeds rapidly at elevated temperatures. Reactions of primary and secondary amines with ammonium thiocyanate proceed at a much faster rate than that of a tertiary amine.

The stoichiometric reaction of one ammonium thiocyanate group per amino group results in products which show strong infrared spectral bands at about 2050 cm$^{-1}$, indicating the presence of thiocyanate and broad bands in the region of 2500$^{-1}$ to 2800 cm$^{-1}$, indicating the products to be amine salts. By themselves, the amine thiocyanate salts have been found to be either completely inactive towards epoxy resins or exhibit extremely poor and slow reactivity at ambient to moderately elevated temperatures (below 120 degrees C.). However, these salts when added to the epoxy resin compositions containing polyimine curing agents which may also contain other optionally known accelerators (such as phenolics, mercaptans and other thio group containing accelerators known in the prior art), rapidly cure the epoxy resin compositions at ambient temperatures as well as at low to moderately elevated temperatures in moist atmospheres. The amine thiocyanate salts embodied in this invention may also be prepared in situ by simply mixing the desired amount of ammonium thiocyanate (based on the desired amounts of catalyst needed in the hardener composition) in the polyimine hardeners and allowing the reaction (evidenced by ammonia evolution) to go to completion at temperatures at or below 120 degrees C. The resulting accelerators accelerate the curing of epoxy resin-polyaimine compositions in a moist atmosphere to such an extent that small amounts (from 0.1 to 15% and preferably, from 0.5 to 10% by weight of the total epoxy resin composition) of the accelerator are needed to reduce the cure time several fold.

The types of amines useful in the formation of the amine-thiocyanate salt accelerators include mono-, di-, and polyamine containing primary, secondary, tertiary amine groups and mixed primary and secondary amine groups and combinations of these with tertiary amine groups and also the amido amines obtainable from these amines by reaction with carboxylic acids. The amides and amido amines may also contain other functionalities such as ether, thio ether, urethane, urea and the like groups in the backbone. Typical examples of such amines are butylamine, hexyl amine, dodecylamines, cyclohexylamine, ethylene diamine, diethylene triamine, triethylene tetramine, tetraethylene pentamine, and the like, cyclohexane dimethyl diamine, hexamethylene diamine, isophorone diamine, aminoethylpiperazine, triethylamine, triethylenediamine, bis(aminopropyl) piperazine, piperidine, N-alkyl piperidine, piperazine, morpholine, N-alkyl morpholine, dimer acid diamine, poly(oxyalkylene) polyamines, xylylene diamine and the like. In accordance with the present invention, one or more of the above-described polyimines and amine thiocyanate accelerators are combined with the polyepoxide. In order to avoid rapid cure of the mixture, the components should be relatively free of moisture, and the mixing and storage should be done in a moisture free container and in the presence of a relatively moisture free atmosphere.

In accordance with this invention the three essential components of one or more of (1) the above-described polyimines, (2) amine thiocyanate accelerators or catalysts are combined with (3) a polyepoxide. In order to avoid rapid cure of the resulting mixture the components should be kept free of moisture and the mixing and storage of the components should be done in a substantially moisture free container and in the presence of a substantially moisture free atmosphere.

The polyepoxides and polyimines can be combined in a variety of proportions, depending on the type of products desired. Smaller or larger amounts of reactants than the curing amounts will give longer chain soluble products which can be further reacted. The use of curing amounts, (equivalent amounts) on the other hand, give the desired infusible insoluble products. In order to obtain the desired cure, it is generally preferred to combine the polyepoxide with at least 0.6 equivalent of the polyimine. Equivalent amounts of the polyimine include any available amino hydrogen and the —C=N— groups, each —C=N— group being equal to two equivalents as it is converted to a primary amino group. As used herein, equivalent amount means that amount of polyimine needed to furnish one amino hydrogen or potentially amino hydrogen per epoxy group. Preferably the polyepoxide and polyimine are combined in chemical equivalent ratios varying from 0.6:1 to 1.5:1, respectively.

In carrying out the process of this invention, it is sometimes desirable to have the polyepoxide in a mobile liquid condition when the polyimine is added so as to facilitate thorough mixing. The polyepoxides, as described below, are generally viscous to solid materials at ordinary temperatures. The polyepoxides which are liquid but too viscous for ready mixing, can be heated to reduce viscosity or can be diluted with a liquid solvent. Normally solid polyepoxides are likewise either melted or mixed with a liquid solvent for use. Useful solvents include ketones such as acetone, methyl ethyl ketone, methyl isobutyl ketone, isophorone, and the like, esters such as ethyl acetate, butyl acetate, Cellosolve acetate (ethylene glycol monoacetate), methyl Cellosolve acetate (acetate of ethylene glylcol monomethyl ether), and the like, ether alcohols such as methyl, ethyl or butyl ethers of ethylene glycol or diethylene glycol, chlorinated hydrocarbons such as trichloropropane, chloroform, and the like. The foregoing solvents can also be used in admixture with aromatic hydrocarbons such as benzene, toluene, xylene, and/or alcohols such as ethyl, isopropyl or n-butyl alcohol. Solvents which can remain in the cured compositions also may be used and these include diethylphthalate or liquid monoepoxy compounds including glycidyl allyl ether, glycidyl phenyl ether, styrene oxide, and the like as well as cyano-substituted hydrocarbons such as acetonitrile. It is also convenient to employ a glycidyl polyether of a dihydric phenol in admixutre with normally liquid glycidyl polyether of a polylhydric alcohol.

The above-described polyimines which are prepared from polyamines having more than two amino groups, such as, for example, diethylene triamine, will possess active amino hydrogen and may be regarded as reactive ketimines in that they tend to cause a slight thickening of the mixture when combined with the polyepoxide because of the reaction of free secondary amine with epoxy groups. They still, however, possess the latent curing activity. Such reactive ketimines may be combined in various proportions with those polyimines, such as derived from polyamines containing only two primary amino hydrogens, such as ethylene diamine, to improve the activity thereof. Proportions may vary from about 0 to 40% of the reactive polyimine to 100 to 60% by weight of the pure polyimine.

The activity of the cure may be increased by addition of other accelerators, such as, for example small amounts of water, phenol, aliphatic polyamines, mercaptans, carboxylic acids and the like. Preferred amounts of water vary from about 0.5 to about 3% by weight based on the polyimine. Preferred amounts of phenol can vary from about 1% to about 5% by weight based on the polyepoxide and preferred amounts of the aliphatic polyamines can vary from about 0.5 to about 8% by weight based on the polyimine curing agent.

The cure of the above-described mixture of this invention is effected by exposing the mixture to moisture, and preferably a moist atmosphere. The rate of cure up to a certain point will increase with the increased moisture content. In most cases, it is preferred to employ an atmosphere having at least 20% relative humidity, and still more preferable to employ an atmosphere having a relative humidity of from about 30 to 90%.

The temperature employed during the cure may vary over a wide range. Satisfactory rates are obtained at room temperature or lower, but it is generally preferred to apply some heat to accelerate the cure. Temperatures ranging from about 15 degrees C. to about 150 degrees C. or even higher have proved very satisfactory in the curing process of this invention.

The compositions of this invention are particularly useful in the preparation of coating and surfacing compositions. In a typical coating operation the mixture of polyepoxide, polyimine and latent cure accelerator (polyamine thiocyanates) along with other optional materials such as plasticizers, isocyanate prepolymers, flexibilizers, stabilizers and the like is applied to the desired surface such as plastic, sheet molding compound (SMC) concrete, asphalt, metal, plaster, stone, wood, and the like, by conventional coating procedures such as by brushing, dipping, spraying and the like, and then the coating is allowed to remain in a moist atmosphere until it has set to a hard, infusible mass. One convenient method of application of the coatings is by vapor injection wherein the liquid mixture of this invention is sprayed onto the surface to be coated using moist air in the vapor. As noted above, heat may be applied to the coating to accelerate the cure if desired.

The polyimines, along with amine thiocyanate salt, are particularly useful in high solids, solvent-free coatings containing liquid polyepoxides. By carefully excluding moisture from the mixture until use it is possible to formulate solvent-free polyepoxide resin coating agents which have a usable pot life of many hours. These compositions when used as coatings under conditions of temperatures greater than about 60 degrees F. and relative humidity above about 30% produce very practical rates of cure in spray-applied films considerably greater than ten mils in thickness.

The compositions of this invention can also be used in applications such as moisture cure adhesives and in foundry binders. Another important application of the process of this invention is in the production of laminates or resinous articles reinforced with fibrous textiles. Although it is generally preferred to utilize glass cloth for this purpose, any of the other suitable materials in sheet form may be employed such as glass matting, paper, asbestos paper, mica flakes, cotton bats, duck muslin, canvas, non-woven and woven carbon fiber mats, and the like.

This invention is further illustrated in the following representative examples.

EXAMPLE 1

Various ketimines were prepared by following the general procedure given in U.S. Pat. No. 3,291,775. In a typical experiment, 14.2 g of 1,3-bis(aminomethyl) cyclohexane and 30 g of methyl isobutyl ketone were mixed in a round bottomed flask equipped with a Dean Stark type collector with a water condenser, a thermometer with a temperature controller and a nitrogen gas inlet. The Dean Stark tube was filled with methyl isobutyl ketone (MIBK) and the reaction mixture was heated under a nitrogen atmosphere with constant stirring. The reaction temperature was raised to 140 degrees C. during which time the water produced in the reaction was removed azeotropically with excess of methyl isobutyl ketone. When the theoretical amount of water was removed (about 2 hours), the temperature was brought down and the excess of methyl isobutyl ketone was distilled off under reduced pressure. The resulting ketimine which is designated as KA1 was used as an epoxy curing agent as shown in the following examples. Other ketimines using the combination of diethylene triamine/MIBK, ethylene diamine/MIBK and poly(oxy propylene) triamine/MIBK were prepared in a similar manner and designated KA2, KA3, and KA4, respectively.

EXAMPLE 2

The thiocyanate salt of morpholine was prepared by reacting equimolar amounts of morpholine with ammonium thiocyanate. Thus, when 5.22 g of morpholine was mixed with 4.56 g of powdered ammonium thiocyanate, a rapid reaction occurred with ammonia gas evolution taking place. The reaction mixture was heated at 110 degrees C. for 30 minutes during which time ammonia gas evolution was completed. The resulting material was degassed under reduced pressure to give a crystalline solid showing an infrared spectral band at 2060 cm$^{-1}$, showing the presence of the thiocyanate group. This accelerator was used in the following examples as cure accelerator and was designated accelerator "A". Similarly, other accelerators were prepared using different amines and ammonium thiocyanate in equimolar amounts: triethylamine 3 g/ammonium thiocyanate 3 g designated "B"; diethylamine 7.3 g/ammonium thiocyanate 7.6 g designated "C"; N-methyl piperidine 5 g/ammonium thiocyanate 3.8 g designated "D"; and the imidazoline having the structure

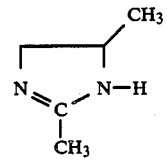

5 g/ammonium thiocyanate 3.8 g designated as "E".

EXAMPLE 3

A mixture of 4.5 g of the ketimine KA1 of Example 1 and 0.5 g of accelerator "B" of Example 2 was prepared and the resulting mixture was mixed with 10 g of liquid diglycidyl ether of Bisphenol-A (DGEPBA, epoxy equivalent weight of 180–190) containing about 0.5% by weight of a polysiloxane, (Byk 300 from Byk Chemical, U.S.A.) to give a curable polyepoxide composition having a pot life under moisture-free conditions of greater than five hours. This polyepoxide composition was applied to the surface of a cold rolled steel plate in the form of a 1 mil thick coating and was cured at 85 degrees C. under 50% relative humidity in an oven. The coating was found to cure and become non-tacky within seven minutes. The film was then postcured at 110 degrees C. for 15 minutes. The resulting glossy film was found to have 100% tape adhesion (ASTM D-3359), a pencil hardness (ASTM D-3363) of 4H and showed reverse impact strength (ASTM D-2794) of greater than 150 inch pounds.

EXAMPLE 4

This example which is for comparative purposes and is outside the scope of the present invention demonstrates that without the use of the cure accelerator of this invention the epoxy resin composition cures at a much slower rate. The procedure of Example 3 was followed using 10 g of DGEBPA and 5 g of the ketimine KA1. The resulting coating (1 mil thick) was found to cure at 85 degrees C. under 50% relative humidity in approximately 46 minutes to give a non-tacky film which was postcured for 15 minutes at 110 degrees C. The resulting film was found to have a pencil hardness of 3H, 100% tape adhesion and showed reverse impact strength of greater than 100 inch pounds.

EXAMPLES 5-19

Various polyepoxide formulations were prepared using various types of ketimine curing agents with and without the cure accelerators of this invention. All of the formulations contained about 0.3% by weight of the polylsiloxane additive in order to have improved wetting and mar resistance in the final coating. These polyepoxide compositions which had room temperature pot life under dry and inert atmospheres of several hours to days, were cured in thin films (1 to 2 mils thick) at 85 degrees C. under 50% relative humidity. The cure speed and physical properties of these cured films are given in the following Table. Examples 5, 11 and 17 are included for comparative purposes and are outside the scope of the present invention. All of the formulations given in the Table showed nearly 100% tape adhesion.

TABLE

| Example No. | Epoxy Composition: Resin Epoxy (g) | Ketimine (g) | Accelerator (g) | Cure Time (Min) | Pencil Hardness | Reverse Impact Strength (in/lbs) |
|---|---|---|---|---|---|---|
| 5 | DGEBPA (10) | KA1 (4.5) | None | 45 | 3H | 100 |
| 6 | (10) | KA1 (4.5) | B (0.5) | 30 | 3H | 100 |
| 7 | (10) | KA1 (5) | D (0.5) | 13 | 3H | 100 |
| 8 | (10) | KA1 (5) | E (0.5) | 6 | 3H | 60 |
| 9 | DGEBPA (8) TMETGE (2) | KA1 (5) | E (0.5) | 6 | 3H | 100 |
| 10 | DGEBPA (5.6) | KA3 (1.5)+ KA4 (3.5) | C (0.28) | 18 | 2H | 150 |
| 11 | (5.6) | KA3 (1.5)+ KA4 (3.5) | None | 60 | 2H | 150 |
| 12 | (5.6) | KA2 (2.6) | B (0.28) | 12 | 3H | 50 |
| 13 | (5.6) | KA2 (2.6) | None | 24 | 2H | 50 |
| 14 | (5.6) | KA2 (1.5)+ KA4 (3.5) | B (0.28) | 9 | 2H | 150 |
| 15 | (5.6) | KA2 (1.5)+ KA4 (3.5) | Nonylphenol (0.3) | 14 | 2H | 150 |
| 16 | (5.6) | KA2 (1.5)+ KA4 (3.5) | Nonylphenol (0.3) +C (0.2) | 8 | 2H | 150 |
| 17 | (6.5) | KA2 (1.5)+ KA3 (1.5) | None | 33 | 3H | 100 |
| 18 | (6.5) | KA2 (1.5)+ KA3 (1.5) | A (0.3) | 23 | 3H | 100 |
| 19 | DGEBPA (6) Hycar (1) | KA1 (3) | E (0.3) | 7 | 2H | 150 |

KA1, KA2, KA3, KA4 are ketimines described in Example 1 and A, B, C, D and E are thiocyanate catalysts described in Example 2; TMETGE = trimethylolethane trigylcidyl ether; Hycar = butadiene/acrylonitrile rubber from BF Goodrich.

I claim:

1. A moisture curable composition comprising a mixture of
   (A) a polyepoxide,
   (B) a polyimine curing agent and
   (C) an amine thiocyanate salt cure accelerator, wherein the chemical equivalent ratio of (A):(B) is in the range of from 0.6:1 to 1.5:1 and (C) is present in from 0.5 to 15% by weight of combined (A) and (B).

2. The composition of claim 1 wherein (A) is a compound containing more than one group of the formula

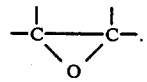

3. The composition of claim 2 wherein (B) is a product of the reaction of an aldehyde or ketone with an aliphatic polyamine.

4. The composition of claim 3 wherein (C) is the thiocyanate salt of an amine selected from the group consisting of butylamine, hexylamine, dodecylamines, cyclohexylamine, ethylene diamine, diethylene triamine, triethylene tetramine, tetraethylene pentamine, cyclohexane diamine, hexamethylene diamine, isophorone diamine, aminoethyl piperazine, triethyl amine, triethylene diamine, bis(aminopropyl) piperazine, piperidine, N-alkyl piperidine, piperazine, morpholine, N-alkyl morpholine, dimer acid diamine, poly(oxy alkylene) polyamines, and xylylene diamine.

5. The composition of claim 4 wherein (A) is a diglycidyl ether of Bisphenol-A.

6. The composition of claim 4 wherein (A) is a mixture of a diglycidyl ether of Bisphenol-A and trimethylolethane triglycidyl ether.

7. The composition of claim 5 wherein (B) is the reaction product of 1,3-bis(aminomethyl) cyclohexane and methyl isobutyl ketone.

8. The composition of claim 5 wherein (B) is the reaction product of diethylene triamine and methyl isobutyl ketone.

9. The composition of claim 5 wherein (B) is the reaction product of ethylene diamine and methyl isobutyl ketone.

10. The composition of claim 5 wherein (B) is the reaction product of poly(oxy propylene) triamine and methyl isobutyl ketone.

11. The composition of claim 6 wherein (B) is the reaction product of 1,3-bis(amino methyl) cyclohexane and methyl isobutyl ketone.

12. The composition of claim 8 wherein (C) is the thiocyanate salt of morpholine.

13. The composition of claim 7 wherein (C) is the thiocyanate salt of triethyl amine.

14. The composition of claim 9 wherein (C) is the thiocyanate salt of diethyl amine.

15. The composition of claim 7 wherein (C) is the thiocyanate salt of N-methyl piperazine.

16. The process comprising curing a mixture of
(A) a polyepoxide,
(B) a polyimine curing agent and
(C) an amine thiocyanate salt cure accelerator,
wherein the chemical equivalent ratio of (A):(B) is in the range of from 0.6:1 to 1.5:1 and (C) is present in from 0.5 to 15% by weight of combined (A) and (B), at a temperature in the range of from about 15° C. to about 150° C. in an atmosphere having a relative humidity in the range of from about 20% to about 90%.

17. The process of claim 16 wherein (A) is a compound containing more than one group of the formula

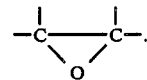

18. The process of claim 17 wherein (B) is a product of the reaction of an aldehyde or ketone with an aliphatic polyamine.

19. The process of claim 18 wherein (C) is the thiocyanate salt of an amine selected from the group consisting of butylamine, hexylamine, dodecylamine, cyclohexylamine, ethylene diamine, diethylene triamine, triethylene tetramine, tetraethylene pentamine, cyclchexane diamine, hexamethylene diamine, isophorone diamine, aminoethyl piperazine, triethyl amine, triethylene diamine, bis(aminopropyl) piperazine, piperidine, N-alkyl piperidine, piperazine, morpholine, N-alkyl morpholine, dimer acid diamine, poly(oxy alkylene) polyamines and xylylene diamine.

20. The process of claim 19 wherein (A) is a diglycidyl ether of Bisphenol-A.

* * * * *